(12) United States Patent
Umeya et al.

(10) Patent No.: US 7,595,099 B2
(45) Date of Patent: Sep. 29, 2009

(54) METHOD OF PRODUCING ANISOTROPIC OPTICAL ELEMENT

(75) Inventors: Masanori Umeya, Tokyo-to (JP);
Hiroyuki Nishimura, Tokyo-to (JP);
Takanori Aono, Tokyo-to (JP); Takuya Yamazaki, Tokyo-to (JP)

(73) Assignee: Dai Nippon Printing Co., Ltd, Tokyo (JP)

( * ) Notice: Subject to any disclaimer, the term of this patent is extended or adjusted under 35 U.S.C. 154(b) by 43 days.

(21) Appl. No.: 11/372,261

(22) Filed: Mar. 10, 2006

(65) Prior Publication Data

US 2006/0222781 A1 Oct. 5, 2006

(30) Foreign Application Priority Data

Mar. 31, 2005 (JP) ............................. 2005-104008

(51) Int. Cl.
*C09K 19/00* (2006.01)
*C09K 19/06* (2006.01)
*C09K 19/52* (2006.01)

(52) U.S. Cl. ..................... 428/1.1; 428/1.3; 430/20; 252/299.01; 252/299.07

(58) Field of Classification Search ................ 430/20; 428/1.1, 1.3; 252/299.01, 299.07
See application file for complete search history.

(56) References Cited

U.S. PATENT DOCUMENTS 4,781,441 A * 11/1988 Kanbe et al. ................ 349/191

5,730,899 A * 3/1998 Ohnishi et al. ......... 252/299.01
2006/0257586 A1* 11/2006 Umeya ....................... 428/1.1

FOREIGN PATENT DOCUMENTS

| JP | A-2003-84131 | 3/2003 |
| JP | A-2003-315557 | 11/2003 |
| JP | A-2005-003823 | 1/2005 |

* cited by examiner

*Primary Examiner*—Geraldina Visconti
(74) *Attorney, Agent, or Firm*—Oliff & Berridge, PLC (57) ABSTRACT

The present invention provides a method of producing simply and precisely an anisotropic optical element having optical properties that are anisotropic with respect to a direction of a normal to an element plane. After forming an uncured film by applying flatwise a radiation-polymerizable cholesteric liquid crystal to a substrate (step 101), the film is heated to convert the cholesteric phase of the liquid crystal in the film into an isotropic phase (step 102). Thereafter, the isotropic phase of the liquid crystal in the film is converted into the cholesteric phase thereof, with a gas blown on the film from a predetermined direction (step 103). By doing so, the liquid crystal is oriented in such a manner that a mean direction of directions of helical axes (a main direction of helical axes) in liquid crystal domains in the film is tilted, relative to a direction of a normal to a film plane, along a stream of the gas blown. Lastly, the liquid crystal in the film is polymerized with the phase of the liquid crystal in the film maintained cholesteric (step 104). By this, the above-described state of orientation of the liquid crystal in the film is fixed as it is, and there is produced an anisotropic optical element having optical properties that are anisotropic with respect to the direction of the normal to the element plane.

10 Claims, 10 Drawing Sheets

METHOD OF PRODUCING ANISOTROPIC OPTICAL ELEMENT

BACKGROUND OF THE INVENTION

1. Field of the Invention

The present invention relates to an optical element comprising a liquid crystalline polymer whose molecules are oriented, and, more particularly, to a method of producing an anisotropic optical element having anisotropic optical properties with respect to a direction of a normal to an element plane.

2. Background Art

Optical elements comprising liquid crystalline polymers of such liquid crystals as cholesteric, nematic, or discotic liquid crystals have been generally known as optical elements of the above-described type. These optical elements function as reflecting elements, optical compensation elements, optical retardation elements, etc., and are used as optical components of liquid crystal panel displays, security appliances, optical-measuring devices, optics, liquid crystal projectors, rear projection televisions, projection screens, and so on.

Of these optical elements, optical elements comprising cholesteric liquid crystals typically function as reflecting elements that reflect a specific component of a polarized light owing to the liquid crystalline structures (helical structures) of the cholesteric liquid crystals. For example, in liquid crystal panel displays, such reflecting elements are used as optical components such as polarized-light-separating reflecting elements, color filters, and negative C plate optical compensation elements. Further, in projection screens on which an image light is projected from a projector, such reflecting elements are used as polarization screens that reflect only a specific polarized component of the image light (see Japanese Patent Laid-Open Publication No. 2005-003823).

In an optical element comprising a cholesteric liquid crystal as described above, directions of helical axes or a mean direction of the directions of helical axes (a main direction of helical axes) in the liquid crystalline structure (helical structure) of the cholesteric liquid crystal has been perpendicular to an element plane, and optical properties of the optical element have therefore been isotropic with respect to a direction of a normal to the element plane.

In the above-described liquid crystal panel displays and projection screens, anisotropic optical properties have been demanded in an increasing number of cases in recent years. Specifically, a possible example of such cases is that, in a projection screen, an angle at which an image light emerges as a reflected light from the projection screen and another angle at which the image light emerges as an interfacial-reflected light from the projection screen are made different from each other so that mirroring of a light source is not recognized by viewers.

However, in the above-described optical elements comprising cholesteric liquid crystals, there has so far existed no practical method for producing an optical element having optical properties that are anisotropic with respect to a direction of a normal to an element plane.

SUMMARY OF THE INVENTION

The present invention was accomplished in the light of the above-described point. An object of the present invention is, therefore, to provide a method of simply and precisely producing an anisotropic optical element having optical properties that are anisotropic with respect to a direction of a normal to an element plane.

The present invention provides a method of producing an anisotropic optical element having optical properties that are anisotropic with respect to a direction of a normal to an element plane, comprising the steps of applying flatwise, to a substrate to form thereon a film, a polymerizable cholesteric liquid crystal having a first phase transition temperature that is a transition point at which a transition from a cholesteric phase to an isotropic phase on a higher-temperature side occurs and a second phase transition temperature that is a transition point at which a transition from the cholesteric phase to a phase on a lower-temperature side occurs; raising a temperature of the film formed on the substrate to a temperature equal to or more than the first phase transition temperature; causing a transition from the isotropic phase to the cholesteric phase of the liquid crystal in the film and orienting the liquid crystal so that a mean direction of directions of helical axes in liquid crystal domains in the film is tilted relative to a direction of a normal to a film plane, by lowering the temperature of the film to a temperature equal to or less than the first phase transition temperature, with a gas blown, from a predetermined direction, on the film whose temperature has been raised to the temperature equal to or more than the first phase transition temperature; and polymerizing the liquid crystal in the film with the liquid crystal in the film maintained at the cholesteric phase.

In the present invention, it is preferred that, in the step of orienting the liquid crystal, the temperature of the film be lowered to a temperature equal to or less than the second phase transition temperature (e.g., a room temperature). The temperature of the film may also be lowered to a temperature between the first and the second phase transition temperatures.

Further, in the present invention, it is preferred that the liquid crystal be a radiation-polymerizable liquid crystal and that, in the step of polymerizing the liquid crystal, radiation be applied to the liquid crystal in the film to polymerize the same.

According to the present invention, after an uncured film formed by applying flatwise a radiation-polymerizable cholesteric liquid crystal to a substrate has been heated to convert the cholesteric phase of the liquid crystal in the film into an isotropic phase, the isotropic phase of the liquid crystal in the film is converted into the cholesteric phase thereof, with a gas blown on the film from a predetermined direction. Therefore, the liquid crystal is oriented in such a manner that a mean direction of directions of helical axes (a main direction of helical axes) in liquid crystal domains in the film is tilted, relative to a direction of a normal to a film plane, along a stream of the gas blown. For this reason, if the liquid crystal in the film is polymerized with the phase of the liquid crystal in the film maintained cholesteric, the above-described state of orientation of the liquid crystal in the film is fixed as it is. There can thus be produced simply and precisely an anisotropic optical element having optical properties that are anisotropic with respect to the direction of the normal to the element plane.

EMBODIMENTS FOR CARRYING OUT THE INVENTION

Embodiments of the present invention will be described hereinafter with reference to the accompanying drawings.

Figure 1A:
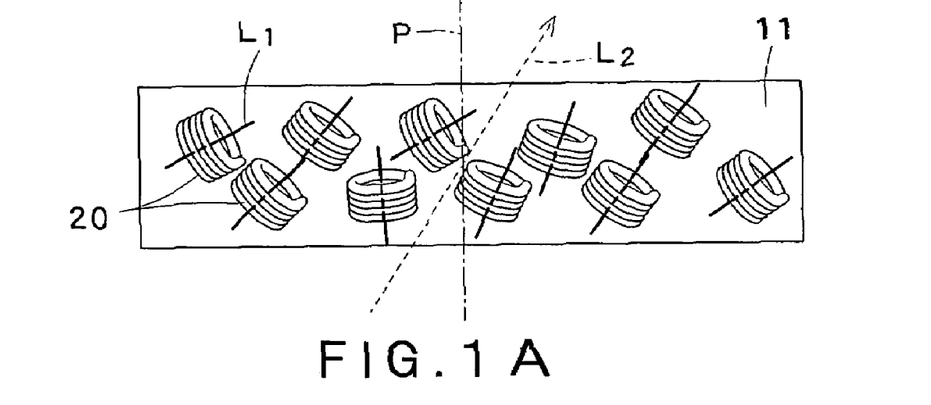
FIG. 1A is a diagrammatic sectional view showing an anisotropic optical element that is produced by a method of producing an anisotropic optical element according to an embodiment of the present invention.
Figure 1B:
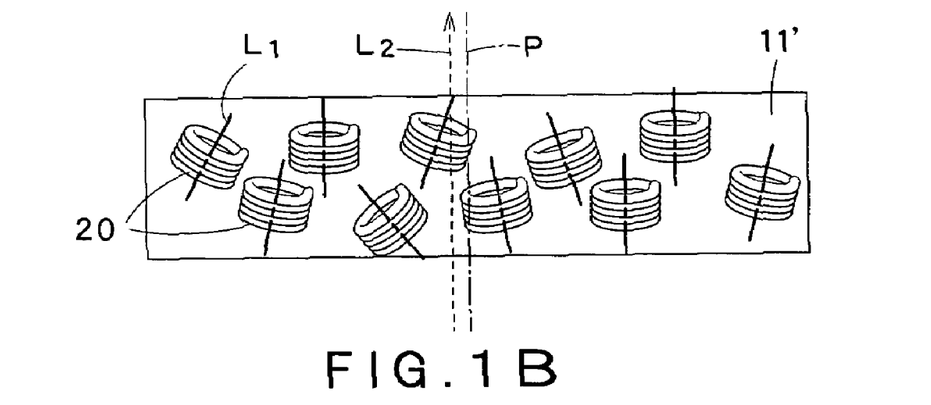
FIGS. 1B and 1C are diagrammatic sectional views showing two conventional isotropic optical elements for comparison.
Figure 1C:
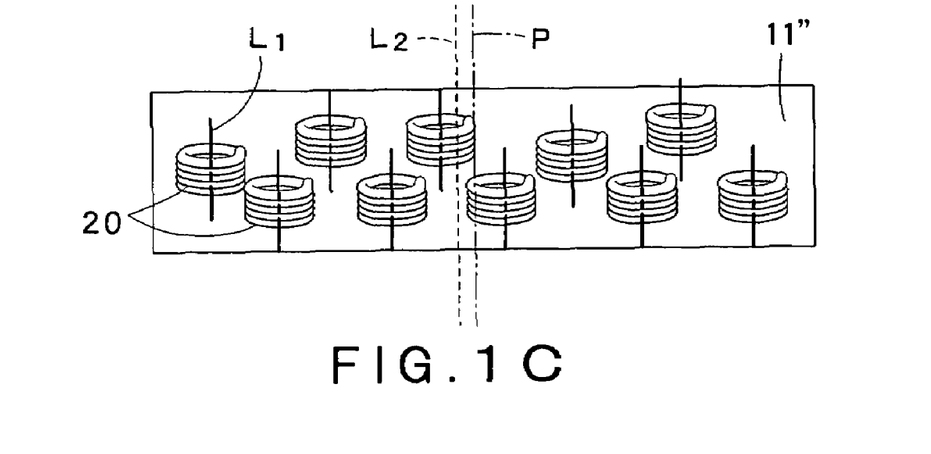

With reference to FIGS. 1A to 1C an anisotropic optical element according to an embodiment of the present invention will be firstly described by comparing it with two conventional isotropic optical elements. In this embodiment, explanation will be given by referring to a case where the anisotropic optical element is a reflecting element that reflects a specific polarized-light component.

As shown in FIG. 1A, the anisotropic optical element according to the present embodiment comprises a cholesteric liquid crystalline reflective layer 11 that reflects a specific polarized-light component.

The cholesteric liquid crystalline reflective layer 11 consists of a radiation-polymerizable cholesteric liquid crystal, and liquid crystalline structure of the liquid crystal is helical one formed by continuous rotation, in a direction of layer thickness, of the director of liquid crystalline molecules.

Owing to such a physical arrangement of molecules, the cholesteric liquid crystalline reflective layer 11 has polarized-light-separating properties, the property of separating a component circularly polarized in one direction from a component circularly polarized in the opposite direction. Namely, the cholesteric liquid crystalline reflective layer 11 splits an unpolarized light entering the layer along helical axis into two lights in two different states of polarization (right-handed circularly polarized light and left-handed circularly polarized light), and transmits one of these lights and reflects the other. This phenomenon is known as circular dichroism. If the direction of helical turn in the liquid crystalline helical structure is properly selected, a component circularly polarized in the same direction as this direction of helical turn is selectively reflected.

The cholesteric liquid crystalline reflective layer 11 is so formed that a mean direction of directions $L_1$ of helical axes (a main direction $L_2$ of helical axes) in liquid crystal domains 20 in the liquid crystalline structure of this layer is tilted relative to a direction P of a normal to a layer plane. Thus, since the main direction $L_2$ of helical axes in the liquid crystalline structure is tilted relative to the direction P of the normal to the layer plane, there can be obtained optical properties that are anisotropic with respect to the direction of the normal to the element plane.

Further, the directions $L_1$ of helical axes in the liquid crystal domains 20 are so made that they vary within a certain range centering around the main direction $L_2$ of the helical axes. By so varying the directions $L_1$ of helical axes in the liquid crystal domains 20 in the liquid crystalline structure, it is possible to diffuse light that is selectively reflected.

The cholesteric liquid crystalline reflective layer 11 having the above-described structure is, as will be described later, formed by applying a cholesteric liquid crystal to a flat substrate and then causing a phase transition to a cholesteric phase of the cholesteric liquid crystal by application of thermal energy or the like. In this process, if a surface of the substrate to which the liquid crystal is applied has no aligning (orienting) power (ability), the directions $L_1$ of helical axes in the liquid crystal domains 20 vary within a certain range centering around the main direction $L_2$ of the helical axes, as shown in FIG. 1A, and the cholesteric liquid crystalline reflective layer 11 exhibits diffuse-reflecting properties (self-diffusing properties), the property of diffusing light that is selectively reflected.

Conventional cholesteric liquid crystalline reflective layers 11' and 11", in which a mean direction of directions $L_1$ of helical axes (a main direction $L_2$ of helical axes) in the liquid crystal domains 20 is not tilted relative to the direction P of the normal to the layer plane, will now be described for comparison.

FIG. 1B shows a liquid crystalline structure of a conventional cholesteric liquid crystalline reflective layer 11' formed on a substrate whose surface, to which a liquid crystal is applied, has no aligning power. In this case, directions $L_1$ of helical axes in liquid crystal domains 20 in the cholesteric liquid crystalline reflective layer 11' vary within a certain range centering around a main direction $L_2$ of the helical axes, and the cholesteric liquid crystalline reflective layer 11' thus exhibits self-diffusing properties. On the other hand, when the substrate has, on its surface, an alignment (orientation) film or the like and therefore has some aligning power, the liquid crystalline molecules are brought to a state of planar orientation, in which all of the directions $L_1$ of helical axes in the liquid crystal domains 20 are perpendicular to the layer plane, as in a cholesteric liquid crystalline reflective layer 11" shown in FIG. 1C, and a liquid crystalline layer formed on such a substrate exhibits specular-reflecting properties, the property of specularly reflecting light that is selectively reflected.

In the liquid crystalline structures of the cholesteric liquid crystalline reflective layers 11', 11" shown in FIGS. 1B and 1C, the mean direction of the directions $L_1$ of helical axes (the main direction $L_2$ of helical axes) in the liquid crystal domains 20 agrees with the direction P of the normal to the layer plane, unlike the liquid crystalline structure of the cholesteric liquid crystalline reflective layer 11 shown in FIG. 1A. The optical properties of these cholesteric liquid crystalline reflective layers 11', 11" are not anisotropic but isotropic.

Figure 2A:
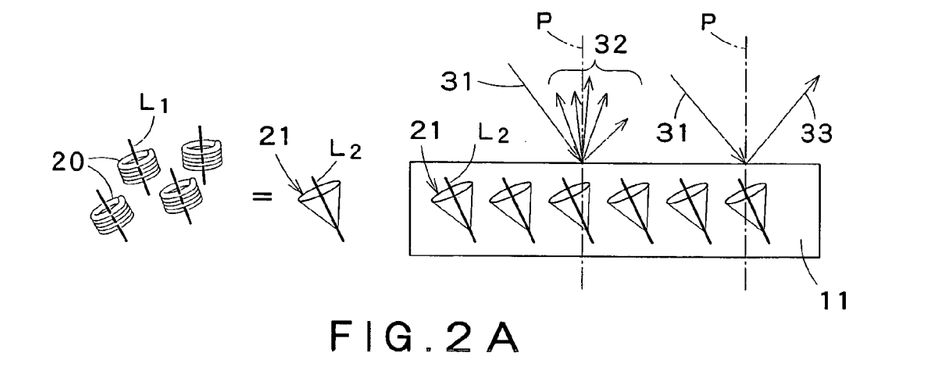
FIG. 2A is an illustration for explaining a function of the anisotropic optical element shown in FIG. 1A.
Figure 2B:
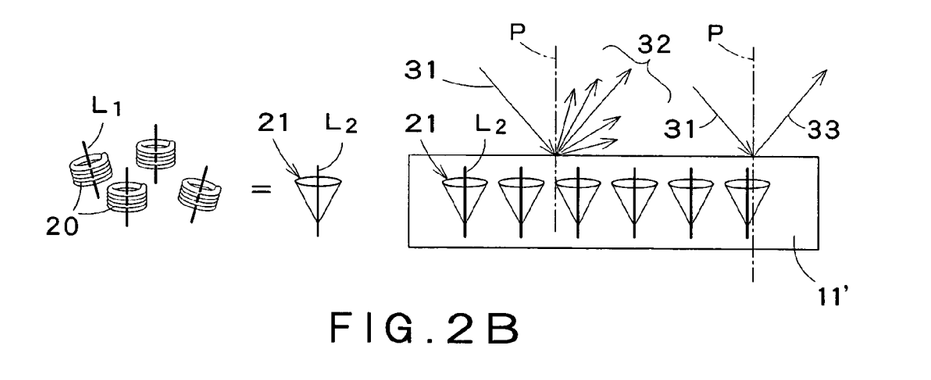
FIG. 2B is an illustration for explaining a function of the anisotropic optical element shown in FIG. 1B.
Figure 2C:
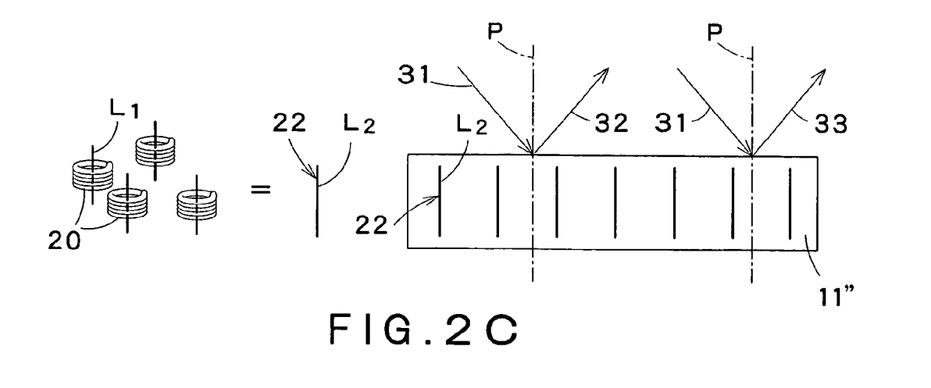
FIG. 2C is an illustration for explaining a function of the anisotropic optical element shown in FIG. 1C.

Next, a function of the cholesteric liquid crystalline reflective layer 11 shown in FIG. 1A, and those of the cholesteric liquid crystalline reflective layers 11', 11" shown in FIGS. 1B and 1C will be described with reference to FIGS. 2A to 2C. In FIGS. 2A to 2C, a collection (aggregation) 21, 22 of liquid crystal domains diagrammatically shows the directions $L_1$ of helical axes in a plurality of the liquid crystal domains 20 and variations of the directions L1, and the longitudinal axis of the collection 21, 22 corresponds to the main direction $L_2$ of the helical axes. Herein, the variations in the directions $L_1$ of helical axes in the liquid crystal domains 20 are shown by a cone. That is, a case wherein there are variations in the directions $L_1$ of the helical axes (a case of diffuse reflection) is shown by a cone with a circular base area that corresponds to a degree of the variations (see the reference numeral 21). On the other hand, a case wherein there are no variations in the directions $L_1$ of the helical axes (a case of specular reflection) is shown ideally by a line with no circular base area (see the reference numeral 22).

As shown in FIG. 2A, in the cholesteric liquid crystalline reflective layer 11 shown in FIG. 1A, the mean direction of the directions $L_1$ of helical axes (the main direction $L_2$ of helical axes) in the liquid crystal domains 20 is tilted relative to the direction P of the normal to the layer plane, and, at the same time, the directions $L_1$ of helical axes in the liquid crystal domains 20 vary within a certain range centering around the main direction $L_2$ of the helical axes. For this reason, the liquid crystal domains 20 selectively reflect a part of an incident light 31 incident on the cholesteric liquid crystalline reflective layer 11. That is, the part of the incident light is reflected, as an emergent light 32, at an angle of reflection different from another angle of reflection that is common when the main direction $L_2$ of the helical axes agrees with the direction P of the normal to the layer plane. The emergent light 32 emerges as a diffused light owing to the variations in the directions $L_1$ of helical axes in the liquid crystal domains 20. Further, another part of the incident light 31 entering the cholesteric liquid crystalline reflective layer 11 is reflected from the surface of this layer by interfacial reflection, and emerges as an interfacial-reflected light 33. The angle of reflection of the emergent light 32 that is selectively reflected from the liquid crystal domains 20 can be freely selected by properly selecting the mean direction of the directions $L_1$ of helical axes (the main direction $L_2$ of helical axes) in the liquid crystal domains 20.

On the other hand, in the cholesteric liquid crystalline reflective layer 11' shown in FIG. 1B, although the directions $L_1$ of helical axes in the liquid crystal domains 20 vary within a certain range centering around the main direction $L_2$ of the helical axes, the mean direction of the directions $L_1$ of helical axes (the main direction $L_2$ of helical axes) in the liquid crystal domains 20 agrees with the direction P of the normal to the layer plane, as shown in FIG. 2(b). For this reason, although, of an incident light 31 entering the cholesteric liquid crystalline reflective layer 11', an emergent light 32 that has been selectively reflected from the liquid crystal domains 20 emerges as a diffused light owing to the variations in the directions $L_1$ of helical axes in the liquid crystal domains 20, a mean angle of reflection of the diffused light is the same as the angle of reflection that is common when the main direction $L_2$ of the helical axes agrees with the direction P of the normal to the layer plane, and is equal to an angle of incidence of the incident light 31. Therefore, the emergent light 32 thus reflected emerges in the same direction as that in which, of the incident light 31 entering the cholesteric liquid crystalline reflective layer 11', the interfacial-reflected light 33 reflected from the surface of the cholesteric liquid crystalline reflective layer 11' by interfacial reflection emerges.

Further, in the cholesteric liquid crystalline reflective layer 11" shown in FIG. 1C, all of the directions $L_1$ of helical axes in the liquid crystal domains 20 are perpendicular to the layer plane, as shown in FIG. 2(c), and agree with the direction P of the normal to the layer plane. For this reason, of an incident light 31 entering the cholesteric liquid crystalline reflective layer 11", an emergent light 32 selectively reflected from the liquid crystal domains 20 is specularly reflected at an angle of reflection equal to an angle of incidence of the incident light 31. Therefore, the emergent light 32 thus reflected emerges in the same direction as that in which, of the incident light 31 entering the cholesteric liquid crystalline reflective layer 11", the interfacial-reflected light 33 reflected from the surface of the cholesteric liquid crystalline reflective layer 11" by interfacial reflection emerges.

In FIGS. 2A to 2C, the interfacial reflection that occurs on the surfaces of the cholesteric liquid crystalline reflective layers 11, 11', and 11" shown in FIGS. 1A to 1C is caused by a difference in refractive index between two media, and is determined by a direction of a medium-medium interface. Therefore, for example, when an incident light is incident on the interface vertically to the same, the light is reflected from the interface in the same vertical direction; and when an incident light is incident on the interface at an angle of 45°, the light is reflected from the interface at an angle of 45°, the same angle as the angle of incidence of the light.

As can be understood from FIGS. 2B and 2C, in the conventional cholesteric liquid crystalline reflective layers 11' and 11" shown in FIGS. 1B and 1C, respectively, a plane perpendicular to the main direction $L_2$ of helical axes in the liquid crystal domains 20 spreads in the same direction as that in which the surface of the cholesteric liquid crystalline reflective layer 11', 11", an interface, spreads. Therefore, the liquid crystal domains 20 have caused both cholesteric reflection and interfacial reflection, which overlap.

Figure 4:
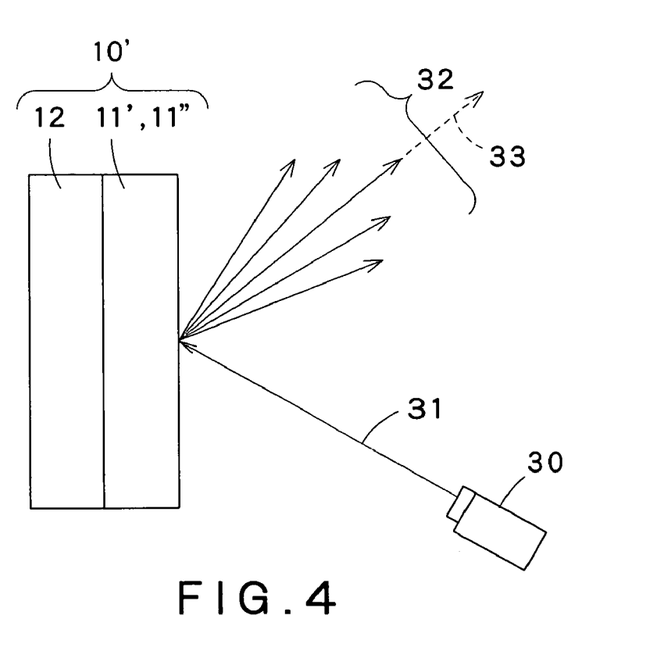
FIG. 4 is a diagrammatic view for explaining a function of a projection screen using, as a reflecting element, a conventional isotropic optical element.

For this reason, for example, when such a cholesteric liquid crystalline reflective layer 11' or 11" is incorporated, as a reflecting element, in a projection screen 10', the cholesteric liquid crystalline reflective layer 11', 11" formed on the substrate 12 causes cholesteric reflection and interfacial reflection in the same direction, as shown in FIG. 4. Therefore, of the image light projected from a projector 30 (incident light 31), the cholesteric-reflected light (emergent light 32) and the interfacial-reflected light 33 are overlapped, and a viewer cannot clearly view an image due to mirroring of the light source caused by the interfacial-reflected light 33. Although it is possible to view the image from a point from which no mirroring of the light source is observed (not a point toward which the interfacial-reflected light 33 mainly travels), only a dark image can be viewed in this case.

One method for solving the above-described problem is that the interfacial-reflected light 33 is eliminated by matting the surface of the cholesteric liquid crystalline reflective layer 11', 11" (imparting roughness to the surface). However, if the surface of the cholesteric liquid crystalline reflective layer 11', 11" is matted, although mirroring of a light source does not occur, directivity for an angle of incidence of an incident light is decreased. Consequently, not only the image light (incident light 31) but also extraneous light such as illumination light is reflected toward the viewer side, which leads to lowering of image contrast in a bright room. Another method is that a roughened layer with lens-shaped regular roughness, or the like is formed on the surface of the cholesteric liquid crystalline reflective layer 11', 11" to let the interfacial-reflected light travel toward the non-viewer side. However, this method is disadvantageous in that the roughened layer produces a stray light and causes hot bands or the like, and that the surface is easily scratched to make the maintenance difficult.

On the other hand, in the cholesteric liquid crystalline reflective layer 11 shown in FIG. 1A, a plane perpendicular to the main direction $L_2$ of helical axes in the liquid crystal domains 20 spreads in a direction different from the direction in which the surface of the cholesteric liquid crystalline reflective layer 11, as an interface, spreads, as can be understood from FIG. 2A. It is, therefore, possible to make a distinction between cholesteric reflection and interfacial reflection that are caused by the liquid crystal domains 20. Further, in the cholesteric liquid crystalline reflective layer 11 shown in FIG. 1A, since diffusibility that is brought about by cholesteric reflection caused by the liquid crystal domains 20 does not depend on the shape of the surface of the cholesteric liquid crystalline reflective layer 11, it is possible to separately control the diffusibility that is brought about by the cholesteric reflection and diffusibility that is brought about by the interfacial reflection. For this reason, the cholesteric reflection and the interfacial reflection can be freely controlled as follows: the cholesteric reflection is made diffuse reflection, and the interfacial reflection is made specular reflection; on the contrary, the cholesteric reflection is made specular reflection, and the interfacial reflection is made diffuse reflection; or both the cholesteric reflection and the interfacial reflection are made diffuse reflection.

Figure 3:
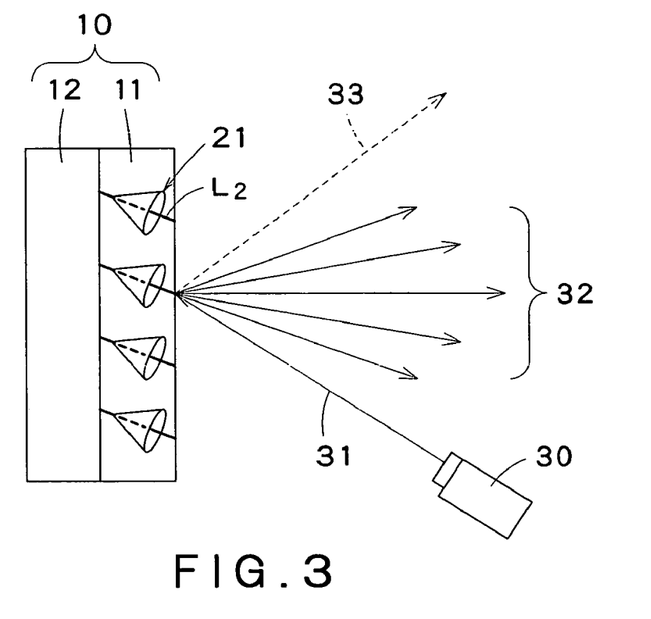
FIG. 3 is a diagrammatic view for explaining a function of a projection screen using, as a reflecting element, the anisotropic optical element shown in FIGS. 1A and 2A.

Therefore, for example, when such a cholesteric liquid crystalline reflective layer 11 is incorporated, as a reflecting element, in a projection screen 10, the cholesteric liquid crystalline reflective layer 11 formed on the substrate 12 causes cholesteric reflection and interfacial reflection in different directions, as shown in FIG. 3, so that, of the image light (incident light 31) projected from a projector 30, the cholesteric-reflected light (emergent light 32) and the interfacial-reflected light 33 are never overlapped. More specifically, as shown in FIG. 3, in a case wherein an image light (incident light 31) is projected by the projector 30 from below the projection screen 10, if the projection screen 10 is set in such a manner that the main direction $L_2$ of helical axes in the liquid crystalline structure of the cholesteric liquid crystalline reflective layer 11 is tilted downwardly relative to the projection screen 10, a viewer who is in front of the projection screen 10 can view the brightest image produced by the cholesteric-reflected light (emergent light 32), and never recognizes the mirroring of the light source caused by the interfacial-reflected light 33. For this reason, even when the surface of the projection screen 10 (cholesteric liquid crystalline reflective layer 11) is kept smooth without being matted, it becomes possible to avoid the mirroring of the light source that is caused by the interfacial-reflected light 33, and a viewer can thus view a bright image with high visibility. In this case, the surface of the projection screen 10 (cholesteric liquid crystalline reflective layer 11) may be slightly matted, and by doing so, it is possible to eliminate mirroring of light other than the image light and thus to view only an image produced by the image light.

Next, a method of producing the anisotropic optical element (cholesteric liquid crystalline reflective layer 11) according to the present embodiment, having the above-described structure, will be described with reference to FIG. 5.

Figure 5:
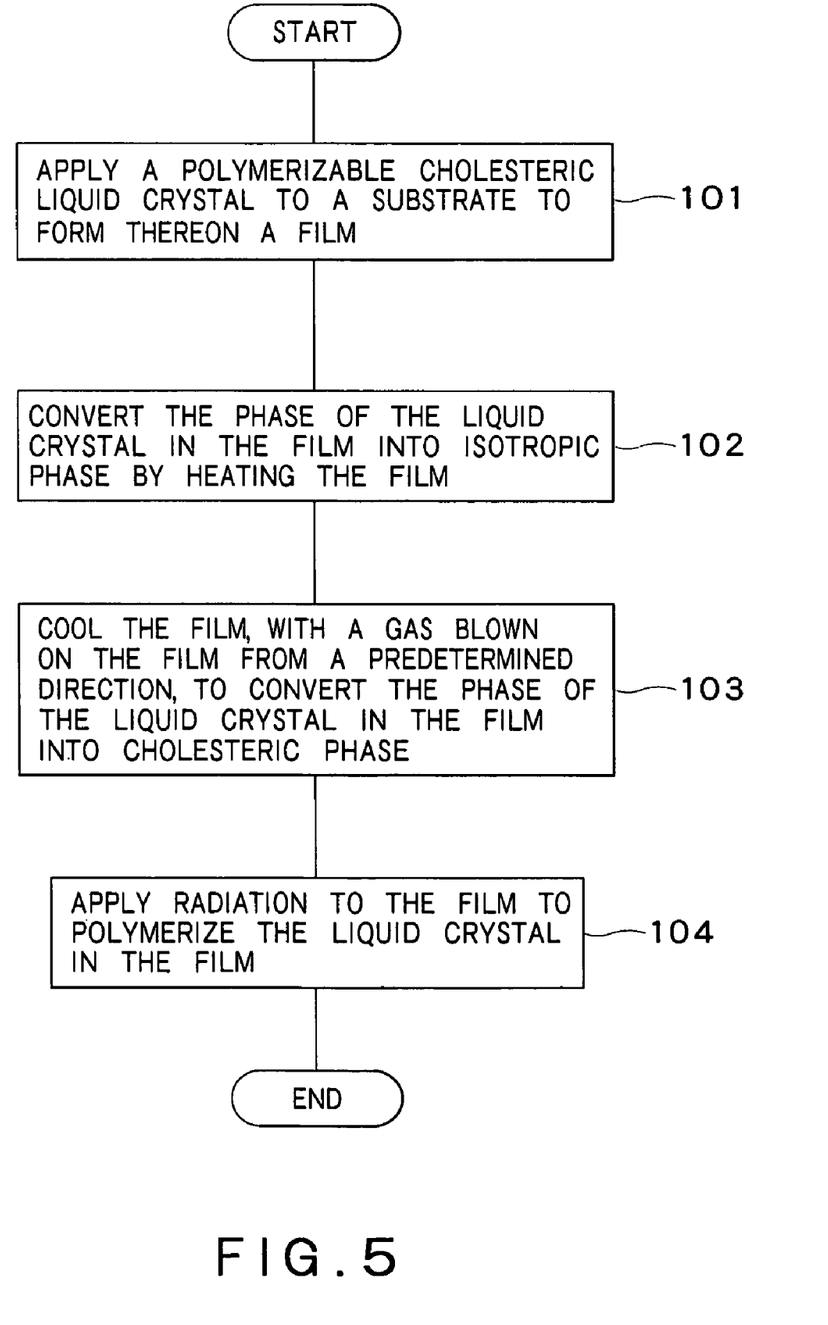
FIG. 5 is a flow chart showing a method of producing an anisotropic optical element according to an embodiment of the present invention.

As shown in FIG. 5, a liquid crystalline composition containing a radiation-polymerizable cholesteric liquid crystal is firstly applied flatwise to a surface of a previously prepared substrate to form thereon an uncured film with a uniform thickness (step 101).

In the above step, any of the existing methods can be employed for the application of the liquid crystalline composition. Specifically, there can be used a spin, blade, slit, or die coating method, for example.

Any substrate with a flat surface can be used as the substrate to which the liquid crystalline composition is applied, and either a film- or sheet-shaped substrate may be used. Moreover, any material that withstands a heating process (a heating process for converting a phase of the liquid crystalline composition into an isotropic phase), which will be described later, can be used for the substrate, and it is possible to use such a material as a plastic or glass. Aligning power may or may not have been imparted to the surface of the substrate. Aligning power can be imparted to the surface of the substrate by forming an alignment film on the substrate, or by subjecting the surface of the substrate to a rubbing treatment, or by using, as the substrate, a stretched plastic film. On the contrary, an ordinary non-stretched plastic, or a resin film or glass plate that has not been subjected to any rubbing treatment, can be used as the substrate having no aligning power.

Further, a cholesteric chiral nematic liquid crystal or a cholesteric liquid crystal may be used as the liquid crystal to be incorporated in the liquid crystalline composition that is applied to the substrate. Any known liquid crystal can be herein used as the liquid crystal, and it is possible to use the liquid crystals described in the above-described Patent Document (Japanese Patent Laid-Open Publication No. 2005-003823), for example. Although such a liquid crystal may be applied, as it is, to the substrate, it may be dissolved in a proper solvent such as an organic solvent into an ink, in order to make viscosity of the liquid crystal fit the applicator and to obtain an excellent state of orientation. When a liquid crystal is used as it is, since viscosity of the liquid crystal is high, it is preferable to heat the liquid crystal until the phase of the liquid crystal becomes approximately isotropic, for example, to increase fluidity of the liquid crystal. The liquid crystal for use herein has a first phase transition temperature (e.g., 90° C.) that is a transition point at which a transition from a cholesteric phase to an isotropic phase on a higher-temperature side occurs, and a second phase transition temperature (e.g., 70° C.) that is a transition point at which a transition from the cholesteric phase to a phase on a lower-temperature side (nematic phase, smectic phase, etc.) occurs.

Next, the uncured film formed on the substrate is heated to a temperature equal to or more than the first phase transition temperature, thereby the phase of the liquid crystal in the film is converted into an isotropic phase (step 102). In this step, although the temperature at which the phase of the liquid crystal in the film becomes isotropic varies depending on the material, this temperature is usually equal to or more than the first phase transition temperature and falls in a range of the first phase transition temperature plus approximately 50° C. (e.g., between 100° C. and 150° C.). Thus, the film is heated to a temperature in this range. When the temperature of the film exceeds this range, such a trouble as decomposition or thermal polymerization of the liquid crystal in the film occurs. On the other hand, when the temperature of the film is lower than the above-described range, the phase transition to the isotropic phase may not occur in some portions of the liquid crystal in the film.

When the liquid crystalline composition to be applied to the substrate contains a solvent, the above-described heating step can be conducted as a drying step for removing the solvent. It is, of course, possible to separately carry out, prior to the heating step, the drying step for removing the solvent. Although a heating (drying) temperature in the drying step that is effected prior to the heating step is properly selected depending on a type of the solvent, this temperature is usually from 25 to 150° C., preferably from 40 to 100° C.

A heating time of the above-described heating step is not more than 3 minutes, preferably from 15 to 45 seconds, if the solvent has been removed in advance from the liquid crystalline composition. On the other hand, when the solvent has not been removed in advance from the liquid crystalline composition, the heating time is preferably from 1 to 5 minutes. When the heating time is excessively short, the phase transition to the isotropic phase does not proceed, and, on the contrary, when it is excessively long, the film tends to have defects such as pin holes or irregularities.

Thereafter, the film that has been heated to the temperature equal to or more than the first phase transition temperature to cause the phase transition to the isotropic phase is cooled to a temperature equal to or less than the first phase transition temperature of the liquid crystal, with a gas blown on the film from a predetermined direction. By doing so, the isotropic phase of the liquid crystal in the film is converted into the cholesteric phase, and, at the same time, the directions of the helical axes in liquid crystal domains in the film are tilted along a stream of the gas blown, whereby the liquid crystal is oriented in such a manner that the mean direction of the directions of helical axes (the main direction of helical axes) in the liquid crystal domains in the film is tilted relative to the direction of the normal to the film plane (step 103).

In the above step, if aligning power has been imparted in advance to the surface of the substrate, all of the directions of the helical axes in the liquid crystal domains in the film are tilted, relative to the substrate plane, in the same direction, so that a film for specular reflection is obtained. On the other hand, if aligning power has not been imparted to the surface of the substrate, although the directions of the helical axes in the liquid crystal domains in the film vary, they are tilted, as a whole, in a specific direction, i.e., the main direction of the helical axes, and, as a result, a film for diffuse-reflection is obtained.

The phenomenon that occurs in the above-described step for orientation is a kind of shear orientation, and it is possible to freely control the tilt of the directions of helical axes in the liquid crystal domains in the film, by adjusting the rate, direction, angle, etc. of the gas (air stream) that is blown on the film. Further, if the rate, direction, angle, etc. of the gas (air stream) are adjusted section by section, in the substrate plane, it is possible to form, in one plane of the finally formed cholesteric liquid crystalline reflective layer, a plurality of sections that are different in the main direction of helical axes.

The rate (wind velocity) of the gas (air stream) that is blown on the film determines the degree of anisotropism of the resulting cholesteric liquid crystalline reflective layer, and this rate is preferably from 1 to 100 m/second. When the gas is blown at a greater rate, a cholesteric liquid crystalline reflective layer that is more anisotropic is obtained.

Further, the direction in which the gas (air stream) is blown on the film determines the main direction of helical axes in the cholesteric liquid crystalline reflective layer finally formed, and the main direction of helical axes in the X-Y plane is determined by the direction of the gas (air stream) relative to the X-Y plane. On the other hand, a rising in the Z direction of the main direction of the helical axes is determined by the angle of the gas (air stream) relative to the Z direction (the angle at which the gas is blown on the X-Y plane). Namely, when the angle at which the gas (air stream) is blown on the X-Y plane is made smaller, the tilt of the main direction of the helical axes becomes greater, and the rising in the Z direction of the main direction thus becomes smaller. There is a possibility that the orientation itself of the liquid crystal is disturbed when the angle of the gas (air stream) is made close to vertical to the film. Therefore, the angle at which the gas is blown on the film vertically to the film being taken as 0°, the angle of the gas (air stream) is preferably 30 to 90°, more preferably 45 to 70°.

On the other hand, the temperature of the film may be lowered in such a manner that the isotropic phase of the liquid crystal in the film can be converted into the cholesteric phase thereof and that a gas is blown on the film in this temperature-lowering process. Although there are no restrictions on the lowering rate of the temperature (temperature profile), this rate is in practice from 0.05 to 20° C./second, preferably from 0.15 to 3.5° C./second.

In the above-described temperature-lowering process, the temperature of the film is lowered to a temperature equal to or less than the first phase transition temperature (e.g., 90° C.) of the liquid crystal. The liquid crystal in the film therefore becomes cholesteric, and, owing to a self-accumulating action of the liquid crystalline molecules themselves, director of the liquid crystalline molecules continuously rotates in the direction of the film thickness to form a helical structure.

Further, in the above-described temperature-lowering process, the temperature of the film may be lowered to a specified temperature between the first phase transition temperature (e.g., 90° C.) and the second phase transition temperature (e.g., 70° C.) of the liquid crystal, or to a temperature lower than the second phase transition temperature of the liquid crystal (e.g., a room temperature), at which the subsequent step for polymerization is conducted. Even if the temperature is thus changed, the phase of the liquid crystal in the film remains cholesteric under a state of supercooling. The film-temperature-lowering operation may be suspended after the temperature of the film has reached a specified temperature between the first phase transition temperature and the second phase transition temperature of the liquid crystal. By doing so, it is possible to minimize orientation defects such as white opacity of the film, and therefore to obtain a film having a stable liquid crystalline structure.

After converting the isotropic phase of the liquid crystal in the film into the cholesteric phase thereof and orienting the liquid crystal in such a manner that the mean direction of the directions of helical axes (the main direction of helical axes) in the liquid crystal domains in the film is tilted relative to the direction of the normal to the film plane, radiation such as ultraviolet light is applied to the liquid crystal in the film to polymerize the liquid crystal, with the phase of the liquid crystal in the film maintained cholesteric, thereby the state of orientation of the liquid crystal in the film is fixed as it is (step 104).

In the above process, as long as the temperature of the film is equal to or less than the first phase transition temperature of the liquid crystal, the state of orientation of the liquid crystal in the film is maintained as it is even when the blowing of the gas is stopped. Therefore, the liquid crystal in the film is polymerized and is thus fixed, with the phase of the liquid crystal in the film maintained cholesteric.

In the above-described step for polymerization, electron beams, ultraviolet light, or the like may be properly used as the radiation according to the conditions. Generally, it is preferable to use ultraviolet light from the viewpoints of the simplicity of apparatus, and so forth, and a wavelength of the ultraviolet light herein useful is from 250 to 400 nm. Although the amount of the radiation to be applied is properly selected depending on the material of the film, the radiation may be applied in any amount as long as the film can be cured to such a degree that the film can retain its own form (a semi-cured state included). Moreover, the radiation may be applied in any atmosphere including an atmosphere of an inert gas ($N_2$ or Ar) or of air.

(Production System)

A production system for carrying out the production method shown in FIG. 5 will be described hereinafter with reference to FIGS. 6 to 11.

Continuous production systems 40 and 40' for making an anisotropic optical element on a film-shaped substrate will be firstly described with reference to FIGS. 6 and 7, respectively.

Figure 6:
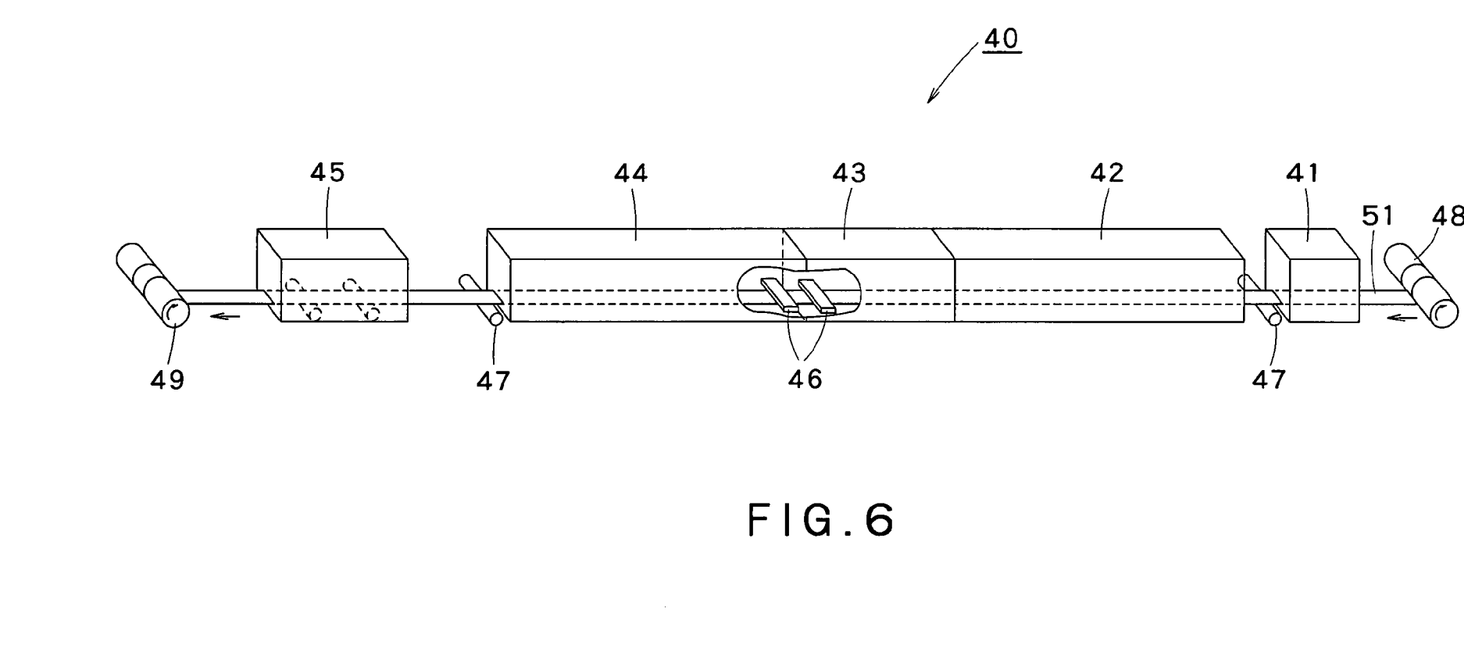
FIG. 6 is a diagrammatic view showing a continuous production system for carrying out a method of producing an anisotropic optical element according to an embodiment of the present invention.

As shown in FIG. 6, a continuous production system 40 comprises a coating section 41, a drying section 42, a first heating section 43, a second heating section 44, and an ultraviolet-light irradiation section 45, and these sections are lined up along a route along which a film-shaped substrate 51 is carried. The film-shaped substrate 51 is unrolled from a feed roll 48, is carried by carrying rolls 47, 47, and is then rolled up by a wind-up roll 49.

The coating section 41, the first heating section 43, the second heating section 44, and the ultraviolet-light irradiation section 45 are provided for conducting the step 101 (the step of coating), the step 102 (the step of heating), the step 103 (the step of orientation), and the step 104 (the step of polymerization), which are shown in FIG. 5. The drying section 42 is provided for removing a solvent contained in a liquid crystalline composition that has been applied to the film-shaped substrate 51, and is positioned on an upstream side of the first heating section 43 in which the step 102 (the step of heating) is conducted. In a case wherein the solvent contained in the liquid crystalline composition that has been applied to the film-shaped substrate 51 is removed in the step 102 (the step of heating) that is conducted in the first heating section 43, the drying section 42 may be omitted as in a continuous production system 40' shown in FIG. 7.

Figure 7:
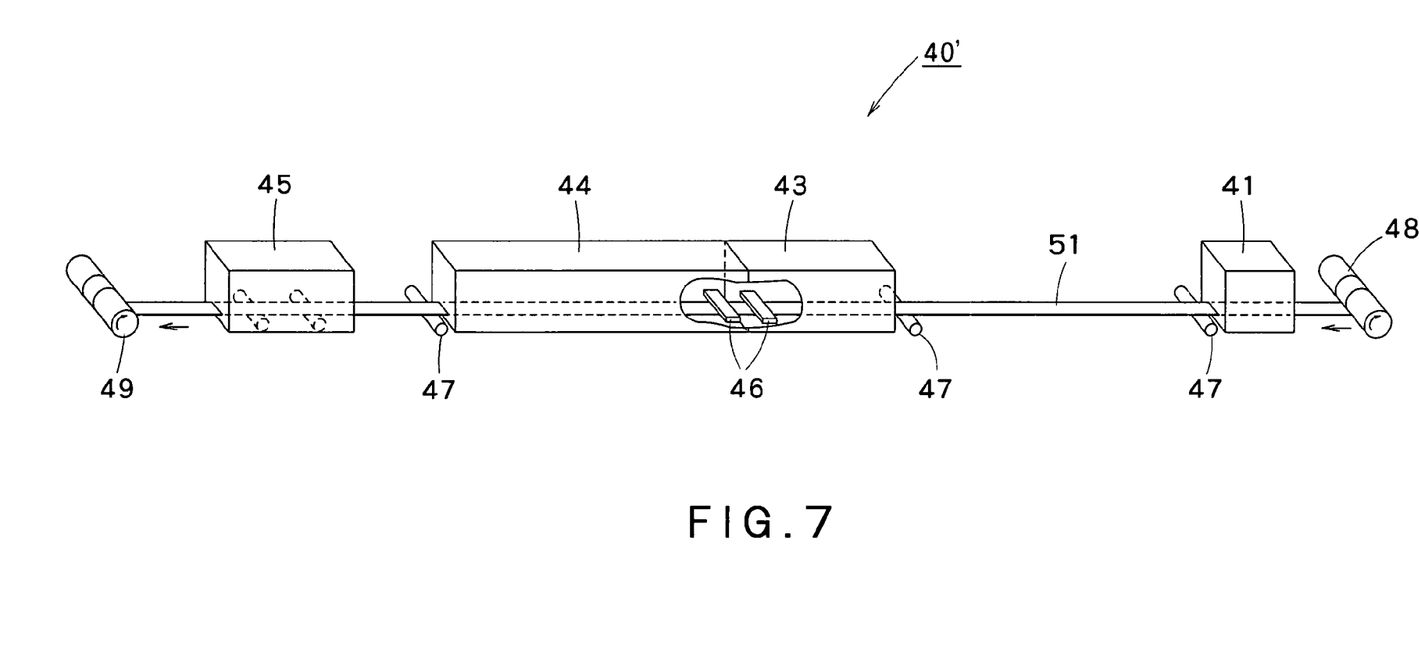
FIG. 7 is a diagrammatic view showing another continuous production system for carrying out a method of producing an anisotropic optical element according to an embodiment of the present invention.

In the continuous production systems 40 and 40' shown in FIGS. 6 and 7, fans 46 are placed in both the first heating section 43 and the second heating section 44, so that it is possible to blow a gas on the film formed on the film-shaped substrate 51 from a predetermined direction at a predetermined angle. More specifically, as shown in FIG. 8, the fan 46 has an injection hole 46a in the shape of a slit, from which a gas is blown, at a predetermined angle, on the liquid crystalline composition (film) on the film-shaped substrate 51 in a direction in which the film-shaped substrate 51 is carried.

Figure 8:
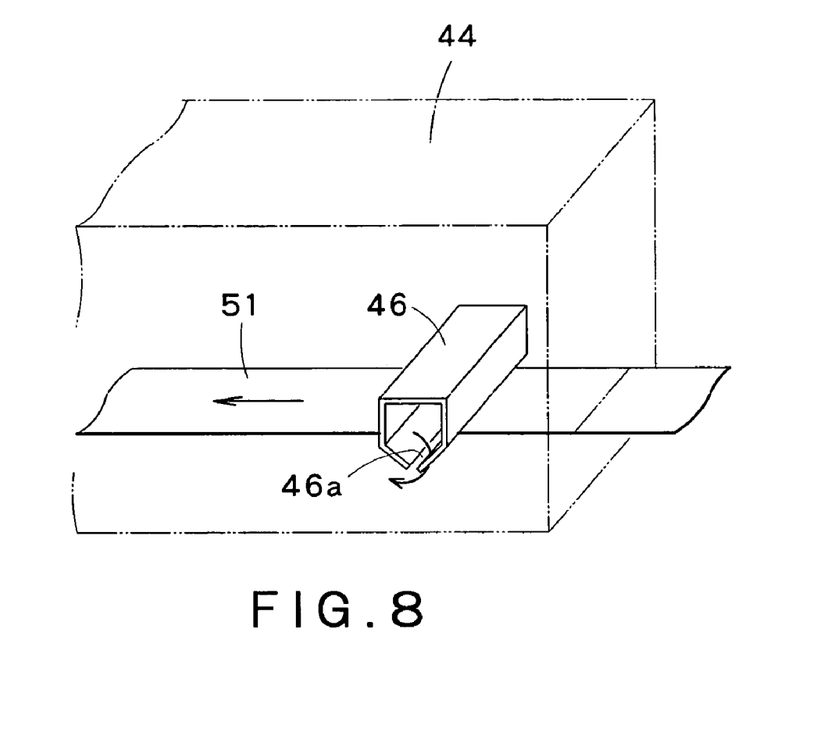
FIG. 8 is a schematic perspective view showing an example of fan that is placed in a heating section of the production system shown in FIG. 6 or 7.
Figure 9:
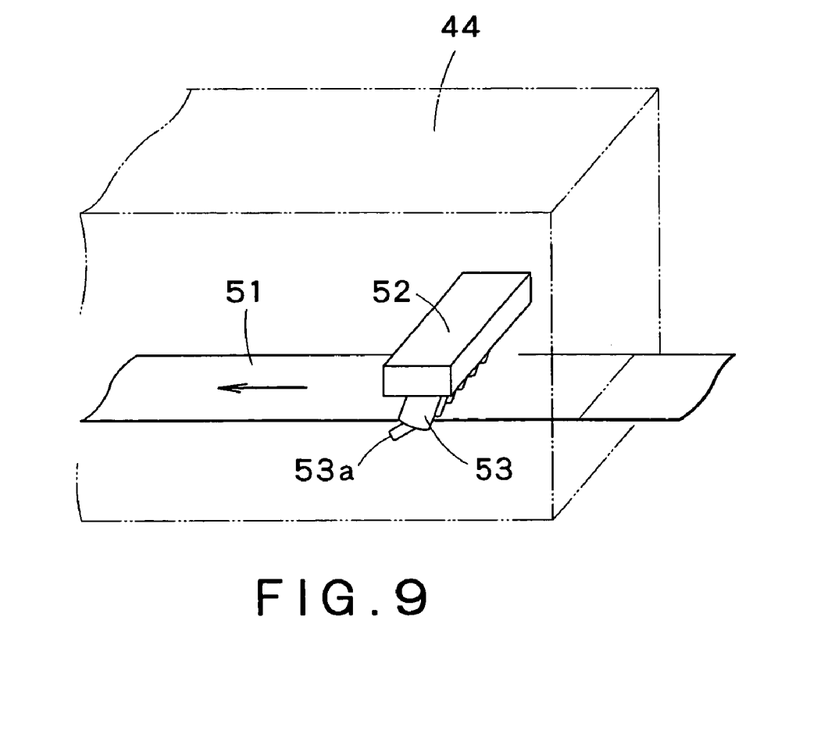
FIG. 9 is a schematic perspective view showing another example of fan that is placed in a heating section of the production system shown in FIG. 6 or 7.

Although the explanation has been given by referring to the fan 46 shown in FIG. 8, having the injection hole 46a in the shape of a slit, other types of fans may also be used herein. Specifically, for example, there may be used such a fan 52 as is shown in FIG. 9, provided with a plurality of gun-shaped injection nozzles 53. The gun-shaped injection nozzles 53 of the fan 52 are arranged in a row vertically to the direction in which the film-shaped substrate 51 is carried, and each injection nozzle 53 has a pipe-shaped injection hole 53a. Therefore, like the fan 46 shown in FIG. 8, the fan 52 can blow a gas, at a predetermined angle, on the liquid crystalline composition (film) on the film-shaped substrate 51 in the direction in which the film-shaped substrate 51 is carried.

Next, sheet-fed production systems 60 and 80 for making an anisotropic optical element on a sheet-shaped substrate will be described with reference to FIGS. 10 and 11, respectively.

Figure 10:
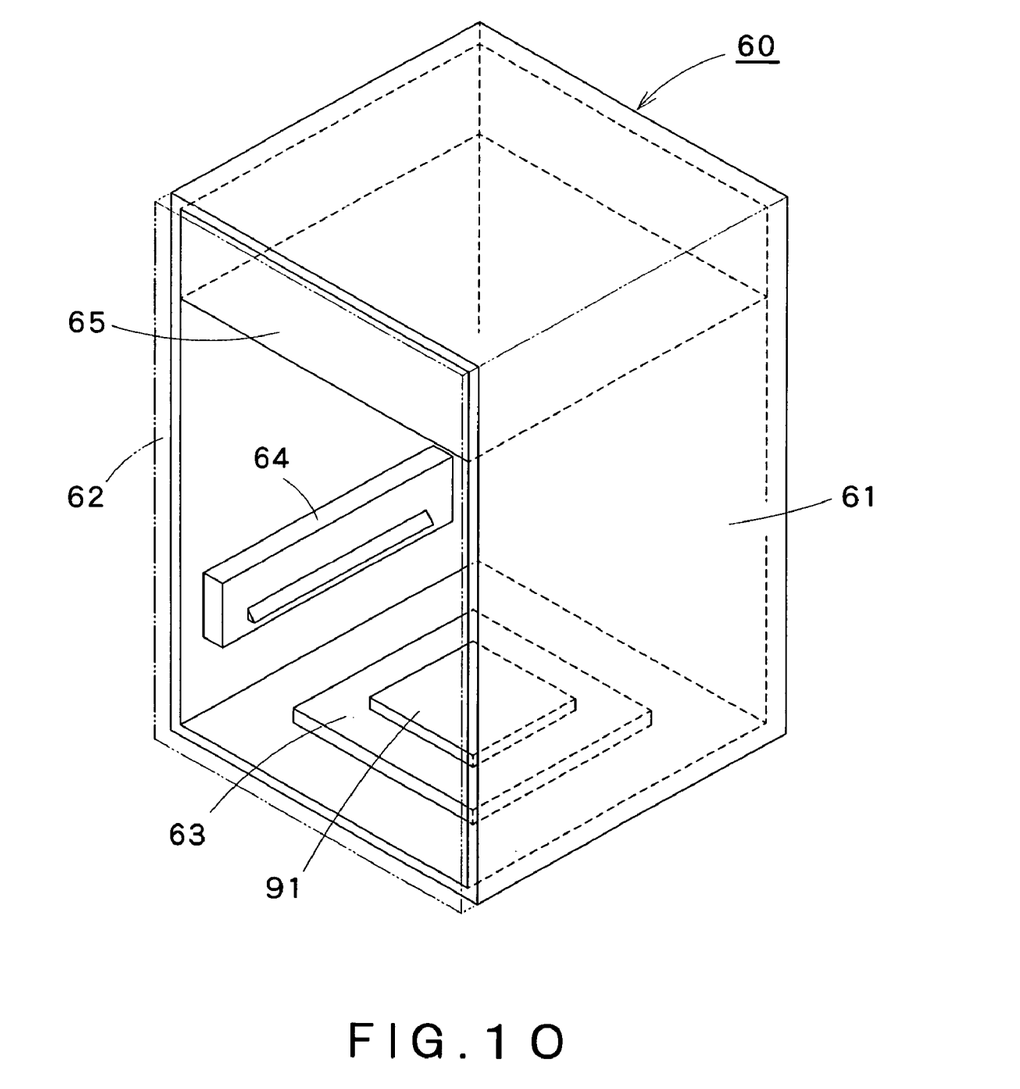
FIG. 10 is a diagrammatic view showing a sheet-fed production system for carrying out a method of producing an anisotropic optical element according to an embodiment of the present invention.

As shown in FIG. 10, a sheet-fed production system 60 comprises a housing body 61, a cover 62 attached to the housing body 61, a hot plate 63 placed in an inner space defined by the housing body 61 and the cover 62, a fan 64, and an ultraviolet-light irradiation unit 65. In such a sheet-fed production system 60, when on the hot plate 63 is placed a sheet-shaped substrate 91 coated with a liquid crystalline composition, the hot plate 63, the fan 64, and the ultraviolet-light irradiation unit 65 cooperate under a proper control, whereby the liquid crystalline composition (film) on the sheet-shaped substrate 91 is successively subjected to the step 102 (the step of heating), the step 103 (the step of orientation), and the step 104 (the step of polymerization) that are shown in FIG. 5.

Figure 11:
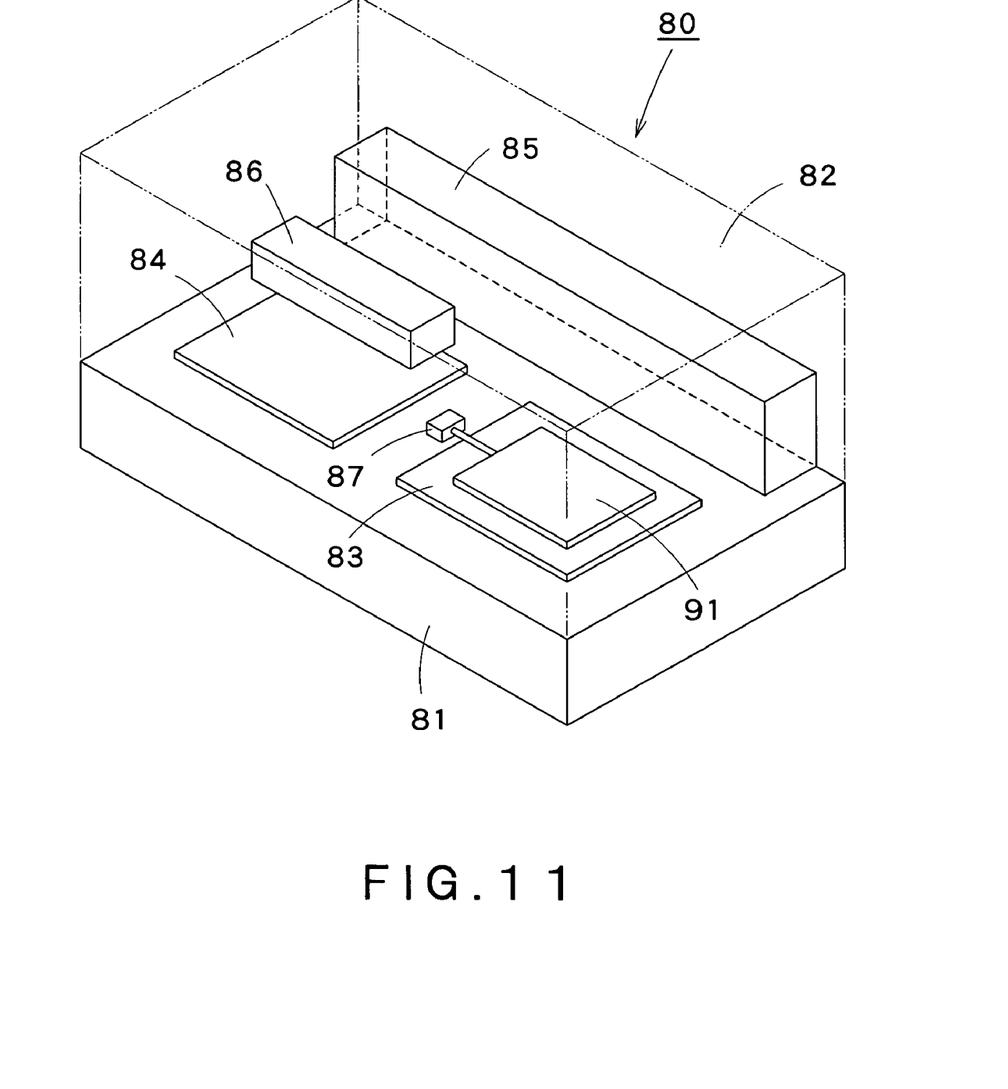
FIG. 11 is a diagrammatic view showing another sheet-fed production system for carrying out a method of producing an anisotropic optical element according to an embodiment of the present invention.

Besides the sheet-fed production system 60 shown in FIG. 10, a sheet-fed production system 80 shown in FIG. 11, for example, may also be used herein.

The sheet-fed production system 80 shown in FIG. 11 comprises a base 81, a cover 82 attached to the base 81, two hot plates 83, 84 placed in an inner space defined by the base 81 and the cover 82, a fan 85, an ultraviolet-light irradiation unit 86, and a robot 87 that carries a sheet-shaped substrate 91 between the two hot plates 83, 84. In such a sheet-fed production system 80, after a sheet-shaped substrate 91 coated with a liquid crystalline composition is once placed on the hot plate 83, the sheet-shaped substrate 91 is positioned either on the hot plate 83 or on the hot plate 84 by the robot 87, and the hot plates 83, 84, the fan 85, and the ultraviolet-light irradiation unit 86 cooperate under a proper control. The liquid crystalline composition (film) on the sheet-shaped substrate 91 is thus successively subjected to the step 102 (the step of heating), the step 103 (the step of orientation), and the step 104 (the step of polymerization) that are shown in FIG. 5.

Thus, according to this embodiment, after the uncured film formed by applying flatwise the radiation-polymerizable cholesteric liquid crystal to the substrate has been heated to convert the phase of the liquid crystal in the film into the isotropic phase, the isotropic phase of the liquid crystal in the film is converted into the cholesteric phase thereof, with the gas blown on the film from the predetermined direction. Therefore, the liquid crystal is oriented in such a manner that the mean direction of directions of helical axes (the main direction of helical axes) in the liquid crystal domains in the film is tilted, relative to the direction of the normal to the film plane, along the stream of the gas blown. For this reason, if the liquid crystal in the film is polymerized with the phase of the liquid crystal in the film maintained cholesteric, the above-described state of orientation of the liquid crystal in the film is fixed as it is, and there can thus be produced simply and precisely an anisotropic optical element having optical properties that are anisotropic with respect to the direction of the normal to the element plane.

EXAMPLES

Specific examples of the above-described embodiments will be given below.

Example 1

A cholesteric liquid crystal solution having a selective reflection center wavelength of 550 nm was prepared by dissolving, in cyclohexanone, a monomer-containing liquid crystal obtained by adding a chiral agent (3% by weight) and a surface-active agent (0.05% by weight) to an ultraviolet-curing nematic liquid crystal (97% by weight), a main agent.

The cholesteric liquid crystal solution prepared in the above-described manner was applied, by die coating, to a 100 mm×100 mm glass substrate (thickness: 1 mm) coated with an alignment film.

This substrate was heated in an oven at 80° C. for 90 seconds, for drying, thereby obtaining a film containing no solvent.

The film-coated glass substrate was taken out from the oven, and was heated on a hot plate to 120° C. in order to make the phase of the liquid crystal in the film isotropic. Subsequently, while a warm air at 20° C. is blown from a fan on the surface of the film at an angle of 45° at a wind velocity of 10 m/second, the film-coated glass substrate was removed from the hot plate and was cooled to 25° C., room temperature.

Thereafter, 10 mW/cm$^2$ of ultraviolet light of 365 nm was applied to the film in an atmosphere of nitrogen for 1 minute in order to cure the film, thereby obtaining an anisotropic optical element having a cholesteric liquid crystalline reflective layer with a selective reflection center wavelength of 550 nm (a reflecting element that specularly reflects a green light). It was confirmed that the main direction of helical axes in the cholesteric liquid crystalline reflective layer in this anisotropic optical element was tilted at an angle of 10° relative to the direction of the normal to the substrate.

Example 2

The cholesteric liquid crystal solution prepared in Example 1 was applied to a 100 mm×100 mm glass substrate (thickness: 1 mm) by die coating.

This substrate was then heated in an oven at 80° C. for 90 seconds, for drying, thereby obtaining a film containing no solvent.

The film-coated glass substrate was taken from of the oven, and was heated on a hot plate to 120° C. in order to make the phase of the liquid crystal in the film isotropic. Subsequently, the film-coated glass substrate was transferred onto another hot plate at 80° C., and was cooled to 80° C. while a warm air at 20° C. is blown from a fan on the surface of the film at an angle of 40° at a wind velocity of 10 m/second. Then, this film-coated glass substrate was removed from the hot plate at 80° C. and was cooled to 25° C., room temperature.

Thereafter, 10 mW/cm$^2$ of ultraviolet light of 365 nm was applied to the film in an atmosphere of nitrogen for 1 minute in order to cure the film, thereby obtaining an anisotropic optical element having a cholesteric liquid crystalline reflective layer with a selective reflection center wavelength of 550 nm (a reflecting element that diffuse-reflects a green light). It was confirmed that the main direction of helical axes in the cholesteric liquid crystalline reflective layer in this anisotropic optical element was tilted at an angle of 10° relative to the direction of the normal to the substrate.

Example 3

A first cholesteric liquid crystal solution having a selective reflection center wavelength of 550 nm was firstly prepared by dissolving, in cyclohexanone, a monomer-containing liquid crystal obtained by adding a chiral agent (3% by weight) and a surface-active agent (0.15% by weight) to an ultraviolet-curing nematic liquid crystal (97% by weight), a main agent.

The first cholesteric liquid crystal solution prepared in the above-described manner was applied to a 100 mm×100 mm glass substrate (thickness: 1 mm) by die coating.

This substrate was heated in an oven at 80° C. for 90 seconds, for drying, thereby obtaining a film containing no solvent.

The film was heated to 120° C. in order to make the phase of the liquid crystal in the film isotropic. Subsequently, while a warm air at 80° C. is blown from a fan on the surface of the film at an angle of 45° at a wind velocity of 10 m/minute, the temperature of the film was lowered to 80° C.

Thereafter, 10 mW/cm$^2$ of ultraviolet light of 365 nm was applied to the film in an atmosphere of nitrogen for 1 minute in order to cure the film, thereby obtaining a first partial selective reflection layer with a selective reflection center wavelength of 550 nm.

Similarly, a second cholesteric liquid crystal solution was applied directly to the first partial selective reflection layer and was subjected to the above-described drying, orienting, and curing treatments. Thus, a second partial selective reflection layer with a selective reflection center wavelength of 610 nm was obtained. Herein, the second cholesteric liquid crystal solution was prepared in the same manner as that in which the first cholesteric liquid crystal solution was prepared, provided that the nematic liquid crystal and the chiral agent were mixed in such a proportion that the resulting layer had a selective reflection center wavelength of 610 nm.

Similarly, a third cholesteric liquid crystal solution was applied directly to the second partial selective reflection layer and was subjected to the above-described drying, orienting, and curing treatments. Thus, a third partial selective reflection layer with a selective reflection center wavelength of 440 nm was obtained. Herein, the third cholesteric liquid crystal solution was prepared in the same manner as that in which the first cholesteric liquid crystal solution was prepared, provided that the nematic liquid crystal and the chiral agent were mixed in such a proportion that the resulting layer had a selective reflection center wavelength of 440 nm.

Thus, there was obtained an anisotropic optical element comprising a cholesteric liquid crystalline reflective layer composed of the first partial selective reflection layer (thickness: 4 μm) selectively reflecting a light in a wave range for a green color (G) (light having a center wavelength at 550 nm), the second partial selective reflection layer (thickness: 5 μm) selectively reflecting a light in a wave range for a red color (R) (light having a center wavelength at 610 nm), and the third partial selective reflection layer (thickness: 3 μm) selectively reflecting a light in a wave range for a blue color (B) (light having a center wavelength at 440 nm) that were successively laminated in the order stated, the first partial selective reflection layer being on the substrate. The cholesteric liquid crystalline reflective layer in the anisotropic optical element obtained in the above-described manner had a liquid crystalline structure that was not in the state of planar orientation, and showed diffuse-reflecting properties. It was found that a main direction of helical axes in each partial selective reflection layer was tilted at an angle of 10° relative to the direction of the normal to the glass substrate, and that all of these tilts were in the same direction.

(Results of Evaluation)

A black pigment was applied to a back surface of the glass substrate of each one of the anisotropic optical elements of Examples 1, 2 and 3, and was then dried to form a light-shielding layer. The anisotropic optical elements with the light-shielding layers obtained in this manner were used as projection screens, and an image light emitted from a projector was projected on each projection screen. A liquid crystal projector (ELP-52 manufactured by Seiko Epson Corporation, Japan) was used as the projector.

Figure 12:
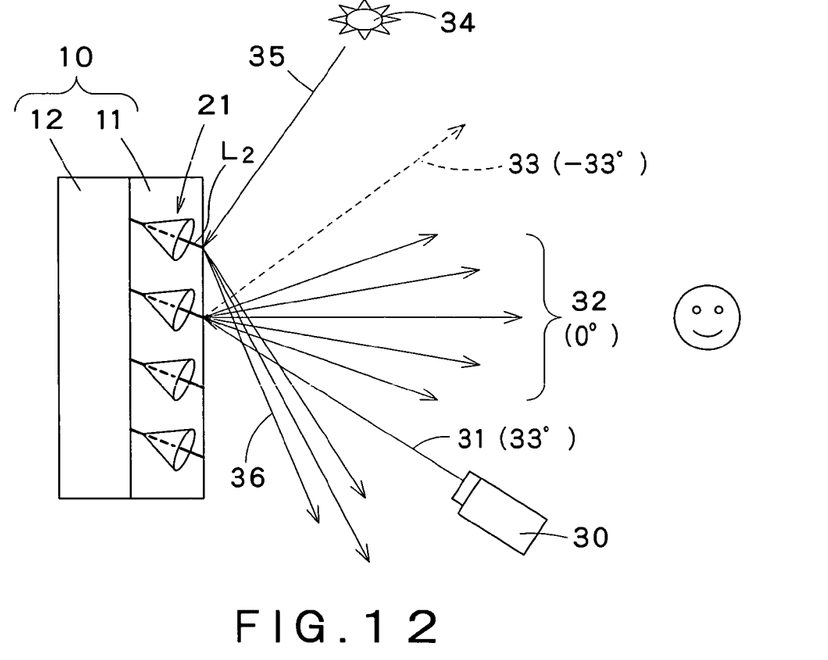
FIG. 12 is a view showing an arrangement of a projection system that is used to evaluate Examples of the present invention.

The projection screen and the projector were arranged in such a positional relationship as is shown in FIG. 12. Namely, the projection screen 10 was set vertically to a floor, as shown in FIG. 12; the height of the projection screen 10 was made 1.3 m above the floor; and the projector 30 was placed on the floor. An illumination light source (extraneous light source 34) was set in a space in which the projection screen 10 and the projector 30 were placed. An extraneous light 35 from the light source 34, illuminating the projection screen 10, was reflected from the projection screen 10 to emerge as a reflected light 36.

The projector 30 was set at such an angle that the image light (incident light 31) was incident on a center portion of the projection screen 10 at an angle of 33°, the angle of a line vertical to the projection screen plane being taken as 0°. On the other hand, the main direction of helical axes in the liquid crystal domains contained in the anisotropic optical element (cholesteric liquid crystalline reflective layer 11) in each projection screen 10 was tilted at an angle of 10° relative to the direction of the normal to the glass substrate, and the projection screen 10 was set so that this tilt faced down (to the projector 30 side).

Figure 13:
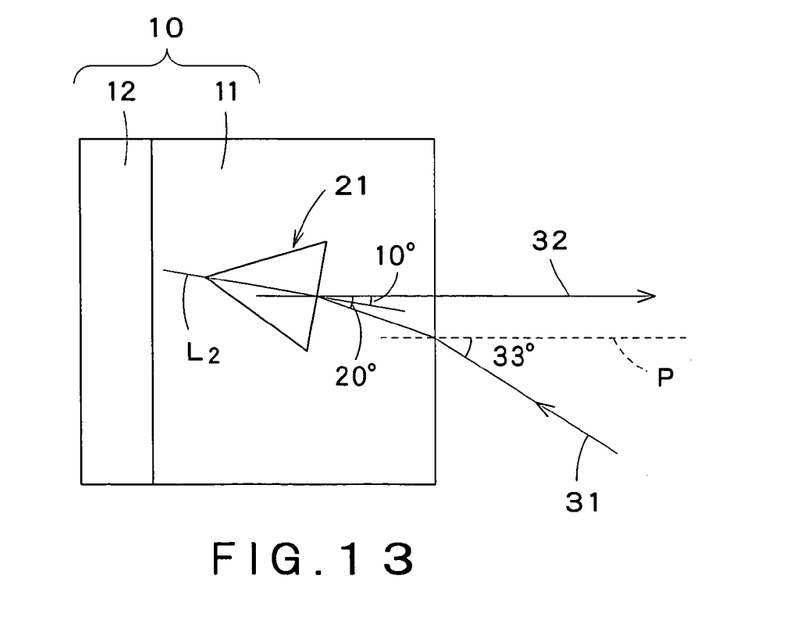
FIG. 13 is a view for explaining the optimum value for the tilt of the main direction of helical axes in cholesteric liquid crystalline reflective layers in Examples of the present invention.

When the projection screen 10 and the projector 30 are placed as described above, to view the projection screen 10, from the front thereof is best for a viewer, because the direction vertical to the screen face is the direction from which the image light can be viewed most brightly (the direction of the reflected light 32). This fact will be explained in more detail with reference to FIG. 13. Assuming that the refractive index of the liquid crystal contained in the cholesteric liquid crystalline reflective layer 11 in the projection screen 10 is 1.58 and that the refractive index of the environment (air) in which the projection screen 10 is placed is 1.0, an image light that is projected on the projection screen 10 (cholesteric liquid crystalline reflective layer 11) at an angle of incidence of 33° enters the projection screen 10 (cholesteric liquid crystalline reflective layer 11) at an angle of 20° (=arcsin ((sin(30°)/ 1.58))) according to Snell's law. For this reason, if the tilt of the main direction of helical axes in the liquid crystalline structure of the cholesteric liquid crystalline reflective layer 11 is 20/2=10°, the reflected light 32 can travel vertically to the projection screen 10.

Under the above conditions, an image light (a still image including white and black areas) was projected on the projection screen from the projector, and was visually observed from the front of the projection screen, at a point near the projector, with the room light on.

As a result, the image on each one of the projection screens of Examples 1, 2, and 3 was sharp and bright, and none of the projection screens caused mirroring of the light source. Further, the image was observed after placing a polarizing filter in order to make the room light (an extraneous light source) mainly emit left-handed circularly polarized light, which the projection screens do not reflect. Then, the image on each projection screen was sharper, and exhibited higher contrast.

The invention claimed is:

1. A method of producing an anisotropic optical element having optical properties that are anisotropic with respect to a direction of a normal to an element plane, comprising the steps of:
   applying flatwise, to a substrate to form thereon a film, a polymerizable cholesteric liquid crystal having a first phase transition temperature that is a transition point at which a transition from a cholesteric phase to an isotropic phase on a higher-temperature side occurs and a second phase transition temperature that is a transition point at which a transition from the cholesteric phase to a phase on a lower-temperature side occurs,
   raising a temperature of the film formed on the substrate to a temperature equal to or more than the first phase transition temperature,
   causing a transition from the isotropic phase to the cholesteric phase of the liquid crystal in the film and orienting the liquid crystal in such a manner that a mean direction of directions of helical axes in liquid crystal domains in the film is tilted in a desired manner relative to a direction of a normal to a film plane, by lowering the temperature of the film to a temperature equal to or less than the first phase transition temperature, with a gas blown, from a predetermined direction corresponding to the desired manner, on the film whose temperature has been raised to the temperature equal to or more than the first phase transition temperature, and
   polymerizing the liquid crystal in the film with the liquid crystal in the film maintained at the cholesteric phase,
   wherein an angle at which the gas is blown is related to a tilt of the mean direction of direction of helical axes such that when the angle at which the gas is blown is made smaller, the tilt of the mean direction of directions of helical axes is made greater.

2. The method according to claim 1, wherein, in the step of orienting the liquid crystal, the temperature of the film is lowered to a temperature equal to or less than the second phase transition temperature.

3. The method according to claim 2, wherein, in the step of orienting the liquid crystal, the temperature of the liquid crystal contained in the film is lowered to a room temperature.

4. The method according to claim 2, wherein, in the step of orienting the liquid crystal, the temperature of the film is lowered to a temperature between the first and the second phase transition temperatures.

5. The method according to claim 3, wherein, in the step of orienting the liquid crystal, the temperature of the film is lowered to a temperature between the first and the second phase transition temperatures.

6. The method according to claim 1, wherein the liquid crystal is a radiation-polymerizable liquid crystal, and, in the step of polymerizing the liquid crystal, radiation is applied to the liquid crystal in the film to polymerize the same.

7. The method according to claim 2, wherein the liquid crystal is a radiation-polymerizable liquid crystal, and, in the step of polymerizing the liquid crystal, radiation is applied to the liquid crystal in the film to polymerize the same.

8. The method according to claim 3, wherein the liquid crystal is a radiation-polymerizable liquid crystal, and, in the step of polymerizing the liquid crystal, radiation is applied to the liquid crystal in the film to polymerize the same.

9. The method according to claim 4, wherein the liquid crystal is a radiation-polymerizable liquid crystal, and, in the step of polymerizing the liquid crystal, radiation is applied to the liquid crystal in the film to polymerize the same.

10. The method according to claim 5, wherein the liquid crystal is a radiation-polymerizable liquid crystal, and, in the step of polymerizing the liquid crystal, radiation is applied to the liquid crystal in the film to polymerize the same.

* * * * *